United States Patent [19]
Baxter

[11] Patent Number: 6,112,910
[45] Date of Patent: Sep. 5, 2000

[54] HOLDER FOR MEDIA STORAGE DEVICES OR CASES THEREFOR

[75] Inventor: Anthony J. Baxter, New York, N.Y.

[73] Assignee: Curve I.D., New York, N.Y.

[21] Appl. No.: 09/106,789

[22] Filed: Jun. 29, 1998

[51] Int. Cl.[7] .................................................. A47G 29/00
[52] U.S. Cl. ............................................................ 211/40
[58] Field of Search .................................. 211/40, 41.12, 211/194

[56] References Cited

U.S. PATENT DOCUMENTS

| | | | |
|---|---|---|---|
| 5,715,948 | 2/1998 | Hung | 211/40 |
| 5,788,088 | 8/1998 | Kao | 211/40 |
| 5,865,320 | 2/1999 | Hamada | 211/40 |

OTHER PUBLICATIONS

Inventors' Digest, Jan./Feb. 1998, "Product Marketing" at p. 21; JMH Publishing, Boston, MA.

*Primary Examiner*—Alvin Chin-Shue
*Assistant Examiner*—Sarah Purol
*Attorney, Agent, or Firm*—Lyon & Lyon LLP

[57] ABSTRACT

A stackable media storage holder, for removably holding a removable media storage devices or cases therefor, is disclosed. A media storage device or case therefor is held in the holder, laterally between at least two opposing lateral restraining members, from behind with at least one rear restraining member, and from below with a lower restraining member. The media storage holder incorporates compatible connectors and receptors which interconnect—and in some instances further lock—to permit stacking of the media storage holder with like holders. Optionally, upper restraining members and/or peripheral connectors and receptors may be provided to aid the stacking or interconnection of multiple adjacent stacks of media storage holders.

7 Claims, 6 Drawing Sheets

Fig. 1a
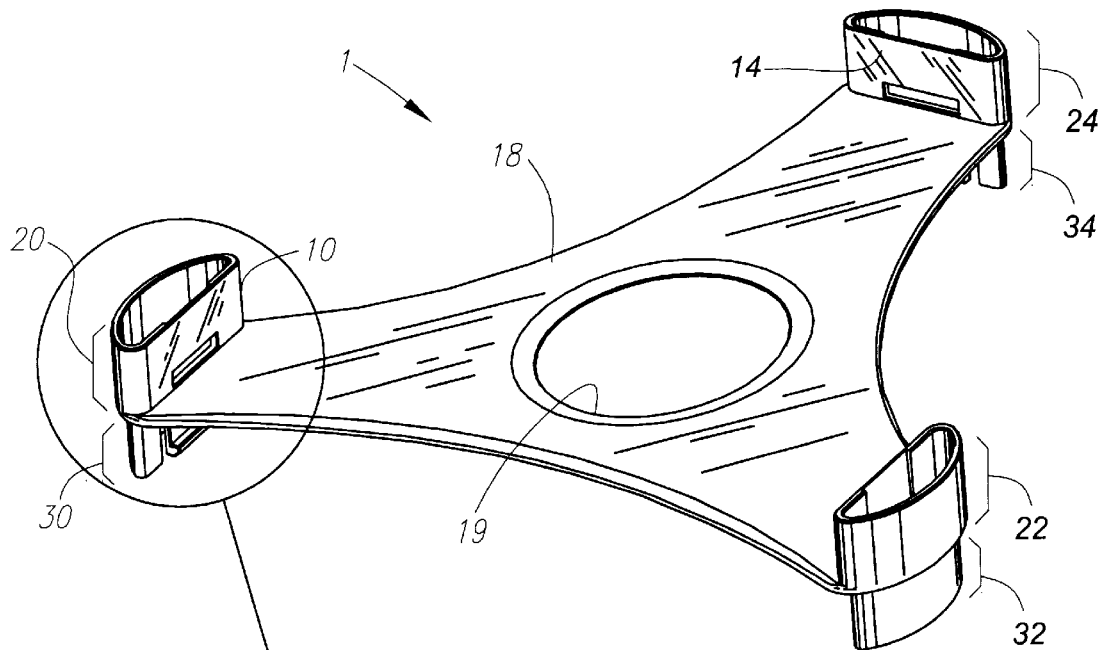
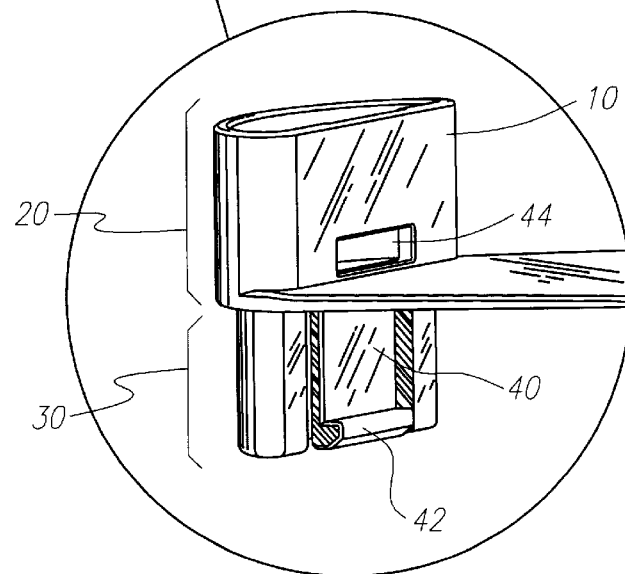
Fig. 1b

HOLDER FOR MEDIA STORAGE DEVICES OR CASES THEREFOR

FIELD OF THE INVENTION

The present invention relates to devices used to hold removable media storage and playback devices—such as compact discs, video disks, video tapes, mini-discs, Zip™ disks, or cassette tapes—or cases used for transportably holding and/or protecting such media storage devices.

BACKGROUND OF THE INVENTION

The deployment of information and entertainment technologies with magnetic, optical, and magneto-optical read and/or write capabilities has led to the proliferation of removable media storage and playback devices. Examples of today's ubiquitous media storage and playback devices include compact discs, video disks, video tapes, mini-discs, Zip disks, and cassette tapes. Consumers are further accumulating such removable media storage and playback devices in ever-increasing quantities. For example, many consumers have sizeable collections of audio compact discs and videotapes.

The need for devices to hold such media devices and cases therefor is apparent from the wide variety of holding racks, cabinets, and holders that are presently available in various shapes and sizes. Presently available holding racks and holders typically hold as few as ten to twenty, or as many as several hundred removable media storage and playback devices. Conventional holding racks and holders, however, suffer from defects that limit their utility. One such defect is insufficient modularity. For instance, they cannot be conveniently and attractively stacked nor can they be expanded incrementally to provide a storage capacity tailored to a particular consumer's evolving media collection. Accordingly, there exists a need for a versatile and modular holder for media storage devices and cases therefor.

SUMMARY OF THE INVENTION

With the understanding and appreciation of these drawbacks to known conventional devices for holding media storage and playback devices and cases therefor, the present invention provides a holder which is stackable. A media storage device or case therefor is held laterally between at least two opposing lateral restraining members of the holder which are spaced apart by at least the width of the media storage device or case therefor. The media storage device or case therefor is further restrained from behind with at least one rear restraining member, and from below by at least one lower restraining member provided as parts of the holder. Connectors and compatible receptors are provided as part of the holder, to permit stacking with other holders.

In a separate aspect of the invention, the holder may be provided with lateral connectors and receptors to aid the stacking or interconnection of multiple adjacent stacks of such holders.

BRIEF DESCRIPTION OF THE DRAWINGS

In the drawings, wherein similar reference numbers denote similar elements throughout the several views:

FIG. 1a is a perspective view of an embodiment of a media storage holder according to the present invention.

FIG. 1b is a detailed perspective view of one connector and one receptor of the holder shown in FIG. 1a.

FIG. 3b is a sectional view of the media storage holder shown in FIG. 3a.

FIG. 3c is a rear elevation view of the media storage holder shown in FIG. 3a.

FIG. 6b is a rear elevation view of a vertically arranged double stack of the media storage holder shown in FIG. 6a.

DETAILED DESCRIPTION OF THE INVENTION

Figure 2A:
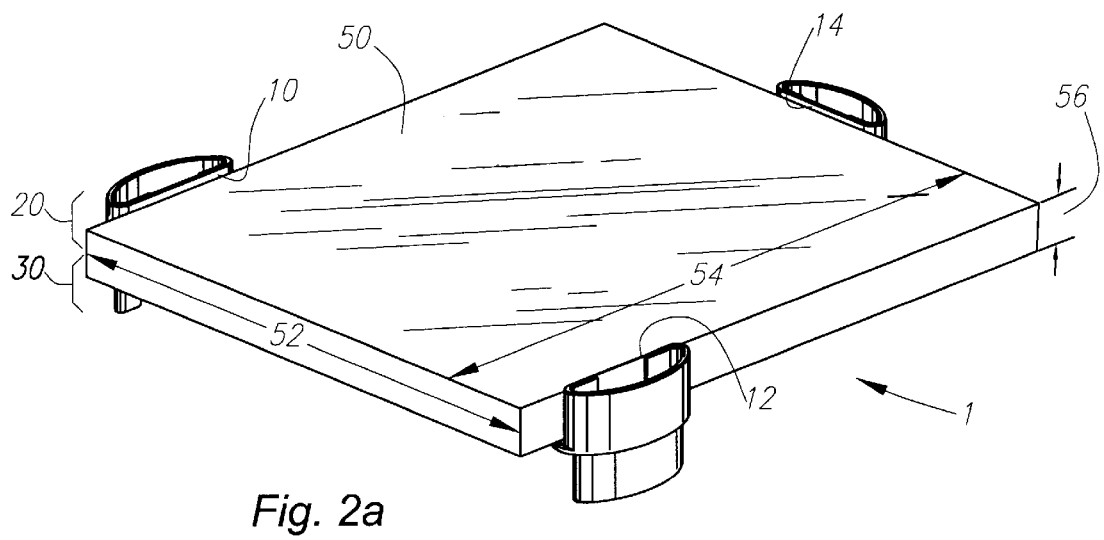
FIG. 2a is a perspective view of a removable media storage and playback device case held in the holder shown in FIG. 1.

FIG. 1a illustrates an embodiment of a media storage holder 1 according to the present invention. A left restraining member 10, right restraining member 12, and rear restraining member 14 are interconnected via a lower restraining member 18. Opening 19 can be provided for aesthetic purposes and to economize on material. The media storage holder 1 may be stacked with like holders (as shown in FIG. 2b). For purposes of describing the present invention, the term "stack" and derivations thereof are meant as an orderly contacting relationship that resists separation by the application of shear force in at least one direction. An incredible variety of different connector and receptor designs which resist shear separation may be used with the present invention, as will be readily apparent to one skilled in the art. For example, instead of protrusions which connect with recesses, hook-and-loop tape material or many other well known connecting means could be used. In this embodiment, the media storage holder 1 has three connectors 30, 32, and 34, and three receptors 20, 22, and 24 that are compatible with each other, i.e. each connector 30, 32, and 34 is designed to interconnect with the respective receptor 20, 22, and 24 of a like holder, to permit stacking of the media storage holder 1 with like holders. While each connector 30, 32, and 34 may be of an identical type, they need not be so, and similarly for the receptors 20, 22, and 24. Where a connector or receptor is formed as an inseparable and coextensive part of a restraining member, it is referred to herein as an "integral" connector or receptor. As can be seen from FIG. 1a, each of the three connectors 20, 22, and 24, and receptors 30, 32, and 34 are integral.

As shown in greater detail in FIG. 1b, the connectors and receptors are further designed to be locking. For purposes of describing the present invention, the term "locking" refers to the resulting connection's resistance to separation (except when unlocked by the user) in a direction collinear with the direction of stacking. In the present embodiment, locking is provided between two adjacent media storage holders 1 when, for example, connector 30 is inserted into receptor 20 and locking tab 42 is thrust into slot 44 by way of spring tab 40. Locking is similarly provided in the present embodiment at the other connectors 32, 34 and receptors 22, 24 of adjacent media storage holders 1.

Figure 2B:
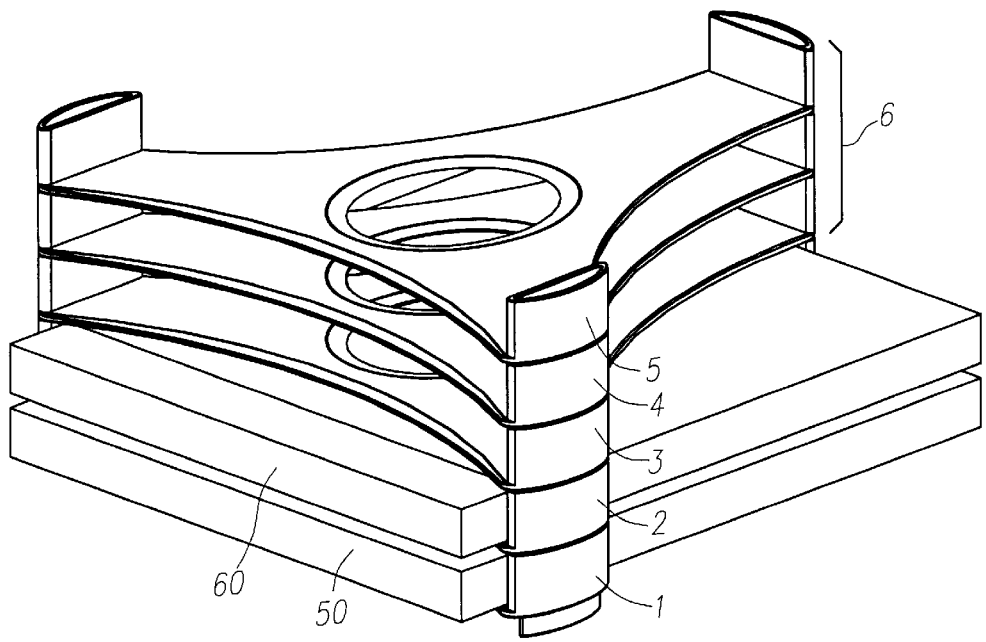
FIG. 2b is a perspective view of two removable media storage and playback device cases held in two holders such as shown in FIG. 1a, that are part of a stack of five such holders.

FIG. 2a illustrates a media storage case 50 held in a media storage holder 1, illustrating the roles of the several restraining members. Where several media storage holders 1 form a stack, such as in FIG. 2b, a media storage case 50 may be inserted into a particular media storage holder 1 by sliding the case 50 between opposing left and right restraining members 10 and 12 until the case 50 contacts the rear restraining member 14. For the purpose of holding a media storage device or case 50 therefor, accordingly, the left and right restraining members 10 and 12 must oppose one another and be spaced apart by a distance that is at least as great as the width 52 of the media storage device or case 50 therefor. The media storage device or case 50 therefor is similarly removed from the holder 1 by grasping an accessible or protruding portion of the media storage device or case 50 and sliding such device or case 50 out from the holder. Use of the term "width" 52 is not intended to denote any quantitative relationship with the length 54 or the thickness 56 of the media storage device or case 50 therefor. Moreover, since embodiments of the present invention may have multiple left and right restraining members which need not be equal in number, the term "opposing" for purposes of describing the present invention is intended to describe the positioning of such left and right restraining members to restrain non-adjacent edges of the media storage device or case therefor. Thus, the term "opposing" as applied to left and right restraining members encompasses both directly and indirectly opposing members, since such left and right restraining members could be slightly offset from one another in a front-to-back direction along the media storage holder 1. Preferably, the left and right restraining members 10 and 12 are spaced apart from each other by a distance that is only slightly greater than the width 52 of the media storage device or case 50 therefor to be held. The distance between the left and right restraining members 10 and 12 must be sufficiently large to permit easy insertion and extraction of the media storage device or case 50 therefor from the media storage holder 1, but such excess is preferably not large enough to allow a media storage device or case 50 to excessively rotate or slide sideways in the holder 1.

FIG. 2b illustrates five media storage holders 1–5 stacked to form a stack 6, along with two media storage cases 50 and 60 held within the bottommost two holders 1 and 2. The terms "top" and "bottom" are used herein with regard to media storage holders oriented in vertical stacks, but are not intended to preclude the positioning or stacking of holders in different orientations, such as horizontally or even upside-down.

Figure 3A:
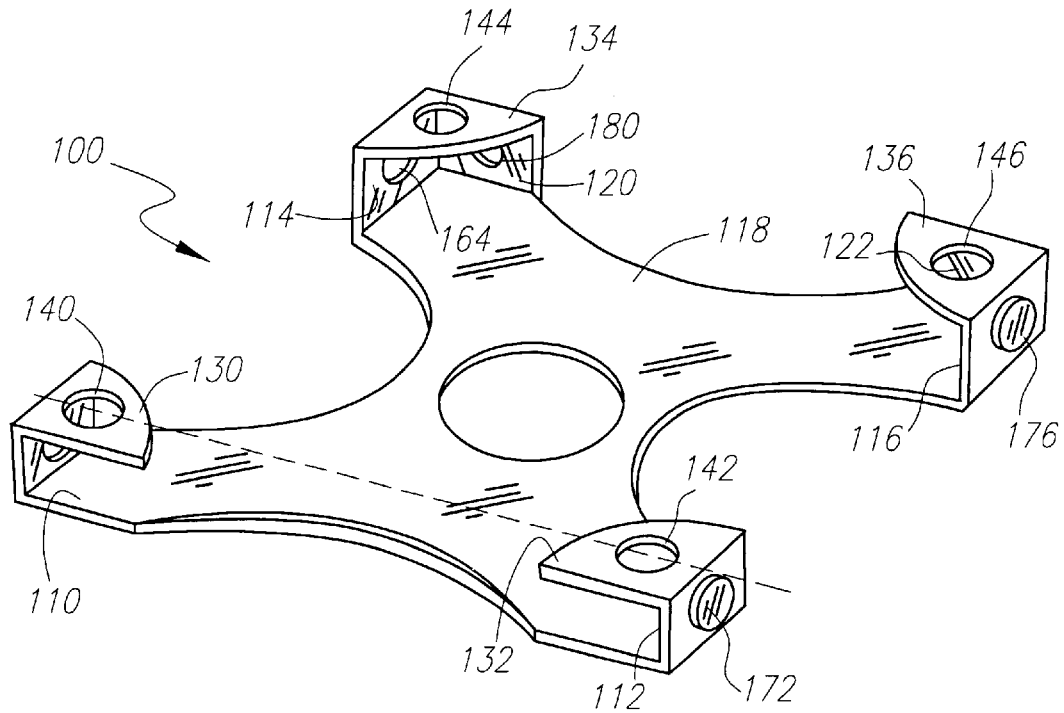
FIG. 3a is a perspective view of another embodiment of a media storage holder.
Figure 3B:
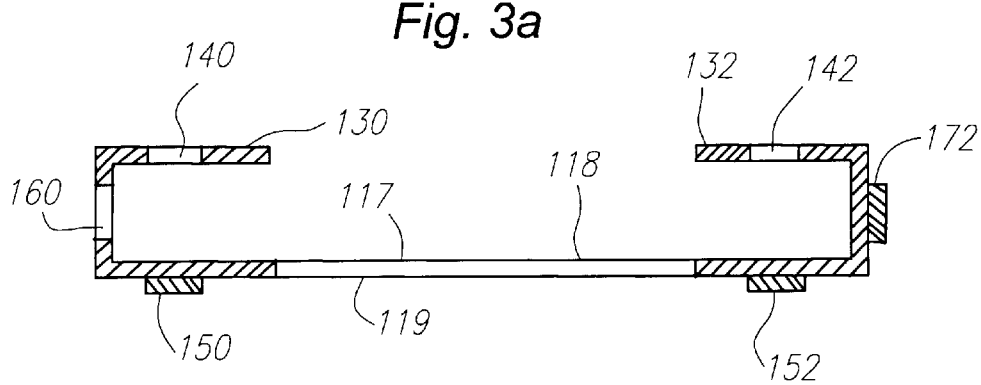
Figure 3C:
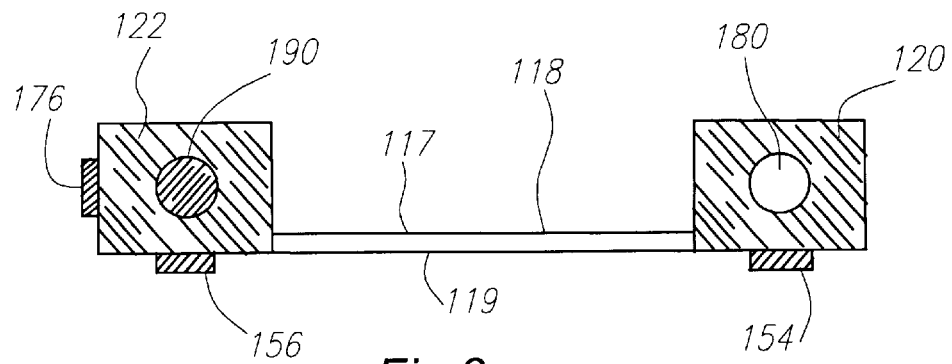

FIGS. 3a–3c illustrate another embodiment of a media holder 100 according to the present invention. FIG. 3a is a perspective view of holder 100, FIG. 3b is a sectional view of the media storage holder 100 along section line 102 of FIG. 3a, and FIG. 3c is a rear elevation view of the same. Media storage holder 100 has four lateral restraining members: two left lateral restraining members 110 and 114 which oppose two right lateral restraining members 112 and 116. There are also rear restraining members 120 and 122 which are connected with lateral restraining members 114 and 116, respectively. A bottom restraining member 118 connects all of the lateral restraining members 110, 112, 114 and 116, and rear restraining members 120 and 122. Though only a single bottom restraining member 118 is shown, other embodiments could include multiple bottom restraining members. Such members could also be movable interconnected to permit expansion of the spacing between opposing lateral restraining members to accommodate different types of media storage devices using a single variety of media storage holder.

Figure 4:
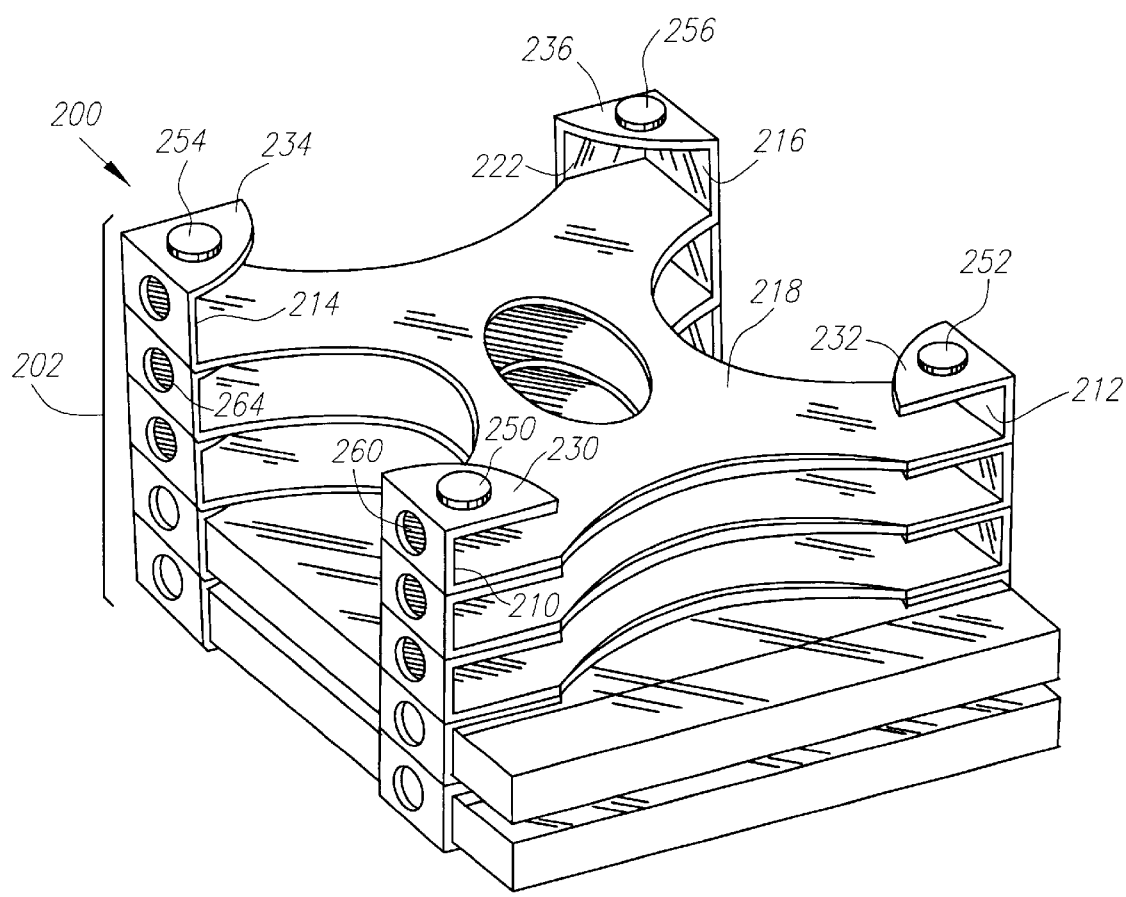
FIG. 4 is a perspective view of two removable media storage and playback device cases held in two holders such as shown in FIG. 3a, that are part of a stack of five such holders.

The media storage holder 100 further has four upper restraining members 130, 132, 134, and 136 which, along with including integral receptors 140, 142, 144, and 146, may prevent the contents of holder 100 from falling out when the holder 100 is oriented upside-down, or vertically. Integral receptors 140, 142, 144 and 146 are designed to interconnect with respective connectors 150, 152, 154, and 156 located along the bottom face 119 of lower restraining member 118 to permit stacking of the media storage holder 100 with like holders, such as is illustrated in FIG. 4. The connectors and receptors illustrated in connection with media storage holder 100 are intended to be merely exemplary since, as noted previously, there exists a wide variety of different connector and receptor designs—of both locking and non-locking varieties—which may be used with the present invention and are well known to one skilled in the art.

Figure 5:
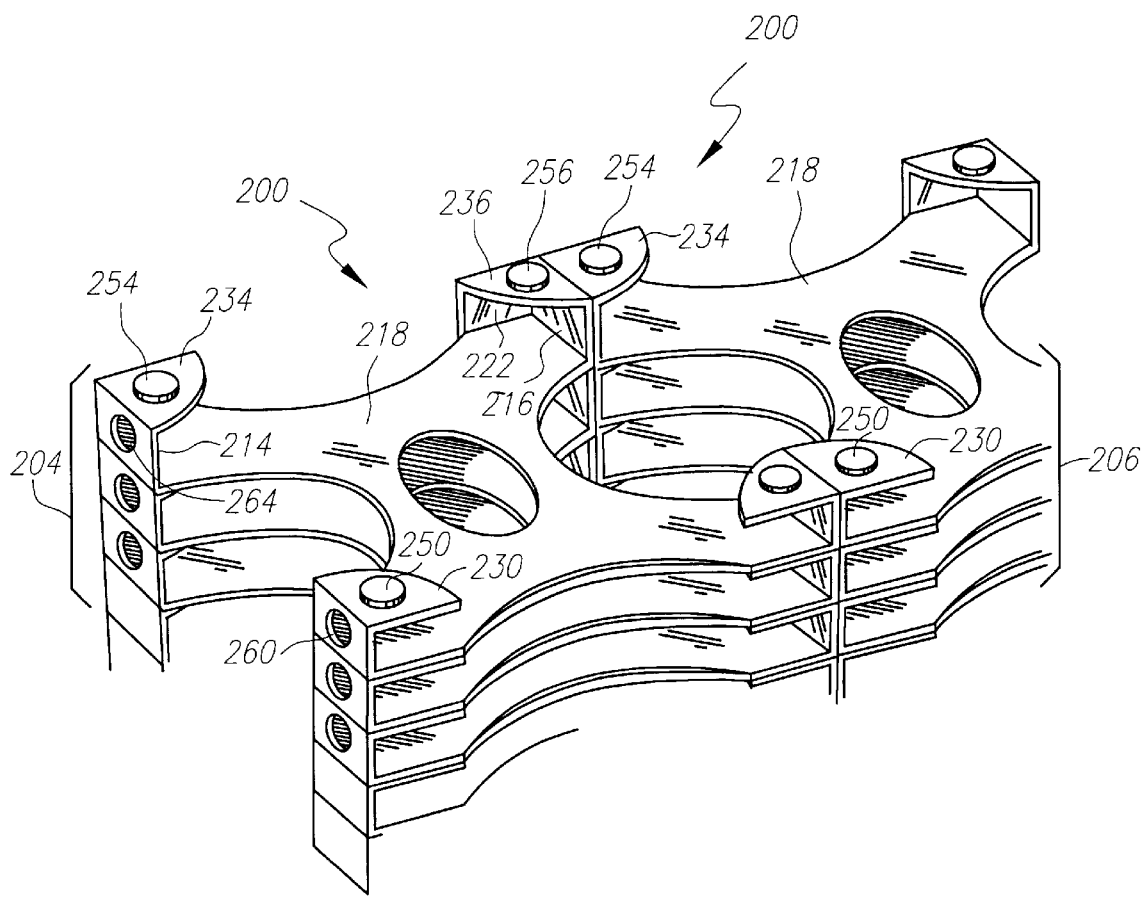
FIG. 5 is a perspective view of two interconnected stacks of the media storage holder shown in FIG. 4.

The media storage holder 100 of the present embodiment further provides peripheral connectors and receptors, such as lateral connectors 172, 176, lateral receptors 160, 164, and rear connector 190 and rear receptor 180. Lateral connectors 172 and 176 (which are integral to right restraining members 112, 116) are designed to interconnect with respective lateral receptors 160, 164 (which are integral to right restraining members 110, 114) of a like holder to permit multiple stacks of media holders to be connected, such as illustrated in FIG. 5, or stacked if desired. Note that the lateral connectors 172, 176 and lateral receptors 160, 164 need not be compatible with the aforementioned connectors 150, 152, 154, 156 and receptors 140, 142, 144, 146.

FIGS. 4 and 5 illustrate still another embodiment of a stacked media storage holder 200 according to a second alternative embodiment 200 of the present invention. FIG. 4 illustrates a media storage holder 200 stacked along with four identical holders to form a stack 202. Each media storage holder 200 is identical to the media storage holder 100 shown and described with reference to FIGS. 3a–3c, except that upper restraining members 230, 232, 234, and 236 have integral connectors and the lower restraining member has compatible receptors (not shown). FIG. 5 illustrates two stacks 204 and 206 each formed by three media storage holders 200, where stacks 204 and 206 are laterally connected via the right lateral connectors 272, 276 (not shown) of the media storage holders 200 forming a stack 204, and the left lateral receptors 260, 264 of the media storage holders 200 forming a stack 206.

Figure 6A:
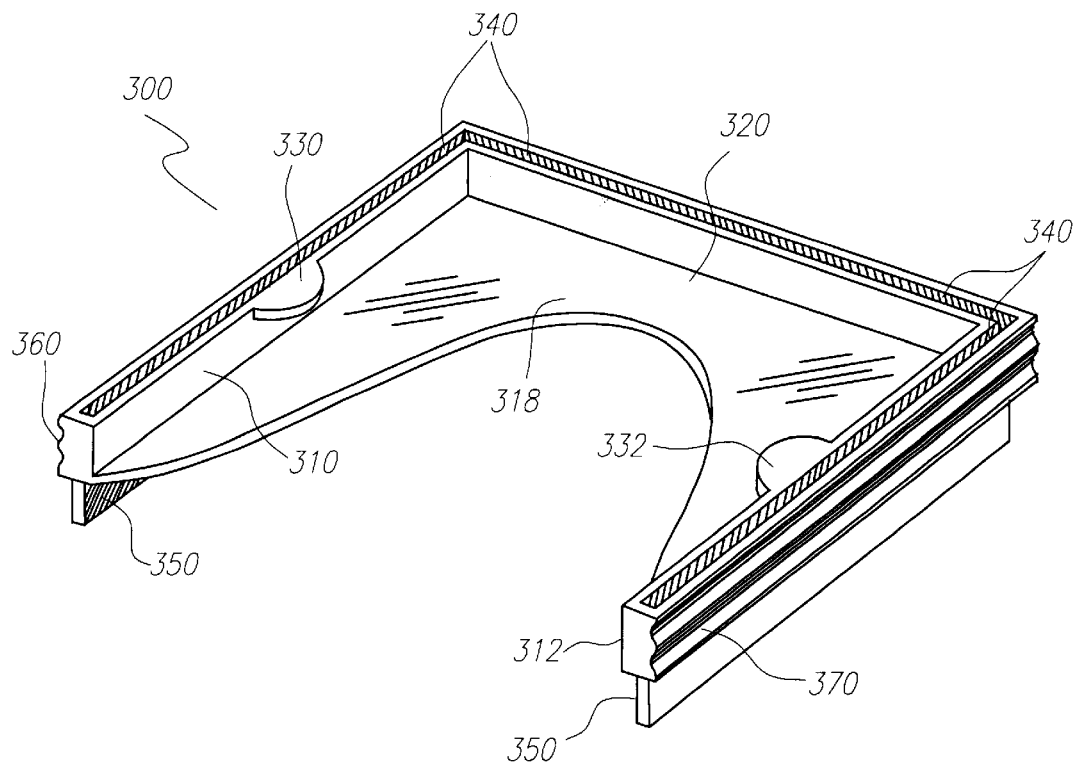
FIG. 6a is a perspective view of still another embodiment of media storage holder.
Figure 6B:
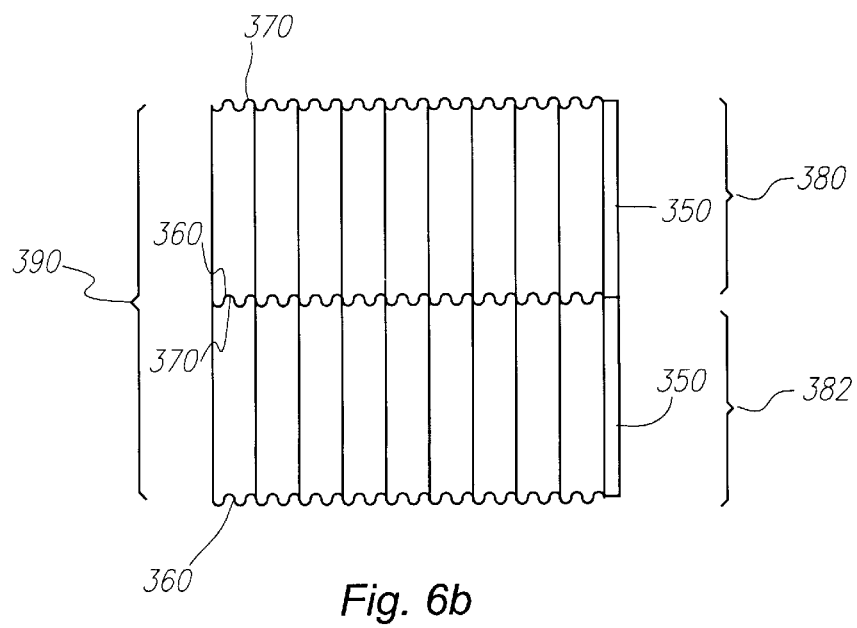

FIG. 6a illustrates yet another embodiment of a media storage holder 300, which has one left restraining member 310 and one right restraining member 312 that are connected by one rear restraining member 320. A lower restraining member 318 further connects the left restraining member 310, the right restraining member 312, and the rear restraining member 320. Two upper restraining members 330 and 332 are connected to the left and right restraining members 310 and 312, respectively, along the uppermost portion of the media storage holder 300. Media storage holder 300 has a single connector 350 and a single receptor 340 that each extend continuously along the left restraining member 310, rear restraining member 320, and right restraining member 312. The connector 350 and the receptor 340 are compatible, such that the connector 350 of one media storage holder 300 interconnects with the receptor 340 of a like holder, to permit stacking of the media storage holder 300 with like holders. Media storage holder 300 further has a peripheral connector 370 and peripheral receptor 360, consisting of compatible fluted edges which allow multiple stacks of media storage holders 300 to be further stacked in rows when such stacks are oriented horizontally. For example, FIG. 6b illustrates two stacked rows 380, 382, each formed by ten media storage holders 300, together forming a double stack 390.

General aspects of the present invention will now be described without reference to any particular figure. A media storage holder can preferably be fabricated by molding from a durable and rigid plastic material, although semi-rigid plastics or other materials may be used. Similarly, a media storage holder could be fabricated from pressed wood or stamped metal having brazed or soldered edges, if necessary. Wall mounting brackets which incorporate connectors or receptors compatible with media storage holders according to the present invention may further be used to enhance versatility. Spacers may be used between adjacent media storage holders, particularly with embodiments such as that shown in FIGS. 1a–2b, which lack upper restraining members, to permit the insertion of unusually thick media storage device cases such as are used for double compact disc cases. A separate end piece may also be used in conjunction with such embodiments to provide upper restraint for the uppermost media storage holder in a stack. Similarly, a separate base piece may be used with such embodiments to provide a broader or more stable lower support below a stack.

It is to be understood that the foregoing description of several embodiments is purely illustrative rather than limiting of the invention, and that the invention is not to be limited except as set forth in the following claims including all legal equivalents thereof.

What is claimed is:

1. A stackable holding device suitable for removably holding no more than one media storage device or case therefor, the holding device having a top and a bottom, and comprising:
    a) one lower restraining member;
    b) one rear restraining member directly connected to said lower restraining member;
    c) one left lateral restraining member directly connected to said lower restraining member and one right lateral restraining member directly connected to said lower restraining member, wherein said left lateral restraining member opposes and is spaced apart from said right lateral restraining member by a distance that is at least that of the width of the media storage device or case therefor to be held; and
    d) up to three connectors and up to three receptors of compatible type, said up to three connectors and up to three receptors being located at the top and bottom of said device;
wherein at least one connector is integral to at least one of said lateral or rear restraining members and at least one receptor is also integral to at least one of said lateral or rear restraining members, and wherein said at least one connector is a locking connector, and said at least one receptor is a locking receptor.

2. The device of claim 1, wherein said locking connector comprises a protruding tab having a spring tab portion and a locking tab portion, and said locking receptor comprises a recess compatible in shape with said protruding tab and an aperture compatible in shape with said locking tab portion.

3. A stackable holding device suitable for removably holding no more than one media storage device or case therefor, the holding device having a top and a bottom, and comprising:
    (a) one lower restraining member having an upper surface, a lower surface, and three sides;
    (b) one rear restraining member directly connected to and protruding upward from said lower restraining member, said rear restraining member defining a locking connector and a locking receptor; and
    (c) one left lateral restraining member directly connected to and protruding upward from said lower retraining member and one right lateral restraining member directly connected to and protruding upward from said lower restraining member, each of said lateral retraining members defining a locking connector comprising a protruding tab having a spring tab portion and a locking tab portion and further defining a locking receptor comprising a recess compatible in shape with said protruding tab and an aperture compatible in shape with said locking tab portion,
wherein said left lateral restraining member opposes and is spaced apart from said right lateral restraining member by a distance that is at least that of the width of the media storage device or case therefor to be held, and wherein said rear and lateral restraining members each include an inwardly-facing restraining side.

4. The device of claim 1, wherein said left and right lateral restraining members are spaced apart from each other by a distance that very slightly exceeds the width of the media storage device or case therefor to be held.

5. The device of claim 1, further comprising an upper restraining member spaced apart from said lower restraining member by at least the thickness of the media storage device or case therefor to be held.

6. The device of claim 5, wherein at least one connector is integral to said upper restraining member, and at least one receptor is integral to said lower restraining member.

7. The device of claim 5, wherein at least one connector is integral to said lower restraining member, and at least one receptor is integral to said upper restraining member.

* * * * *